United States Patent
Mayer Pujadas et al.

(10) Patent No.: US 9,017,775 B2
(45) Date of Patent: Apr. 28, 2015

(54) TREATMENT OF PARTS WITH METALLIZED FINISH AREAS WITH A DIFFERENTIATED APPEARANCE

(75) Inventors: Augusto Mayer Pujadas, Parets de Valles (ES); José Sanahuja Clot, Parets de Valles (ES)

(73) Assignee: Zanini Auto Grup, S.A., Parets de Valles (Barcelona) (ES)

( * ) Notice: Subject to any disclaimer, the term of this patent is extended or adjusted under 35 U.S.C. 154(b) by 31 days.

(21) Appl. No.: 13/393,037

(22) PCT Filed: Aug. 27, 2010

(86) PCT No.: PCT/EP2010/062558
§ 371 (c)(1),
(2), (4) Date: Mar. 5, 2012

(87) PCT Pub. No.: WO2011/023798
PCT Pub. Date: Mar. 3, 2011

(65) Prior Publication Data
US 2012/0164350 A1    Jun. 28, 2012

(30) Foreign Application Priority Data
Aug. 28, 2009  (ES) .................... 200930637

(51) Int. Cl.
| B44F 1/02 | (2006.01) |
| C25D 5/48 | (2006.01) |
| C25D 5/12 | (2006.01) |
| C23F 4/02 | (2006.01) |
| B23K 26/36 | (2014.01) |
| C23F 1/02 | (2006.01) |
| C23F 1/44 | (2006.01) |
| C25D 5/16 | (2006.01) |

(52) U.S. Cl.
CPC ............... *C23F 4/02* (2013.01); *B23K 26/365* (2013.01); *B44F 1/02* (2013.01); *C23F 1/02* (2013.01); *C23F 1/44* (2013.01); *C25D 5/12* (2013.01); *C25D 5/16* (2013.01); *C25D 5/48* (2013.01)

(58) Field of Classification Search
CPC ............... B44F 1/02; C25D 5/48; C25D 5/12
USPC .................... 427/553, 554, 555, 556
See application file for complete search history.

(56) References Cited

U.S. PATENT DOCUMENTS

| 1,996,187 A * | 4/1935 | Barnhart ................. 148/240 |
| 2002/0097279 A1 | 7/2002 | Mimura et al. ......... 346/140.1 |
| 2006/0060473 A1 | 3/2006 | Mullmaier ............... 205/170 |
| 2006/0086620 A1 | 4/2006 | Chase et al. ............. 205/164 |
| 2006/0210813 A1 | 9/2006 | Fath et al. ............... 428/457 |

FOREIGN PATENT DOCUMENTS

| CN | 101591969 | 12/2009 |
| CN | 101701663 | 5/2010 |
| DE | 10 2005 041 375 | 3/2007 |
| DE | 102005041375 A1 * | 3/2007 |
| EP | 1 123 988 | 8/2001 |
| EP | 2 048 265 | 4/2009 |
| ES | 1044799 | 6/2000 |
| ES | 2 239 907 | 10/2005 |
| JP | 2000-118196 | 4/2000 |
| JP | 2002-146558 | 5/2002 |
| JP | 2008-073723 | 4/2008 |
| JP | 2009-078494 | 4/2009 |
| WO | WO 2006/136319 | 12/2006 |

OTHER PUBLICATIONS

Spanish State of the Art dated Aug. 28, 2009 with an English translation of the relevant portions.
A. Waston, "Applications of decorative nickel plating" *NiDl* (*Nickel Development Institute*, NiDl Technical Series No. 10 050, pp. 1-7 (1989).
International Search Report mailed Nov. 26, 2010 in corresponding PCT International Application No. PCT/EP2010/062558.
Chinese Office Action issued in corresponding Chinese Patent Application No. 201080038430 dated May 5, 2014.
Japanese Office Action issued in corresponding Japanese Patent Application No. 2012-526076 dated Jun. 10, 2014.

* cited by examiner

*Primary Examiner* — Dah-Wei D Yuan
*Assistant Examiner* — Nga Leung V Law
(74) *Attorney, Agent, or Firm* — Ostrolenk Faber LLP

(57) ABSTRACT

The invention relates to a process for the treatment of parts for creating a surface with areas with shiny and matte appearances, in which on the surface previously coated with a first layer of copper and a second layer of metal a selective etching of the second layer is performed, wherein the selective etching of the second layer is performed according to the area or areas to be glazed with respect to the rest of the part. The process allows a finish with areas of a different shine (from mirror shine to matte), the differences in thickness of which cannot be observed by the human eye without optical aids.

6 Claims, No Drawings

TREATMENT OF PARTS WITH METALLIZED FINISH AREAS WITH A DIFFERENTIATED APPEARANCE

CROSS-REFERENCE TO RELATED APPLICATIONS

The present application is a 35 U.S.C. §§371 national phase conversion of PCT/EP2010/062558, filed Aug. 27, 2010, which claims priority of Spanish Patent Application No. P200930637, filed Aug. 28, 2009, the contents of which are incorporated herein by reference. The PCT International Application was published in the English language.

FIELD OF THE INVENTION

The present invention relates to the field of coatings. More specifically, it relates to a process for the treatment of parts which allows combining different shiny and matte finishes in one and the same part.

BACKGROUND OF THE INVENTION

Chromium coatings by electrolytic baths are currently used as a decorative layer protecting against corrosion. These coatings are generally made with electrolytic baths.

In these conventional baths, plastics are not conductors, therefore they require being subjected to complex pretreatment process in order to be able to receive the coatings.

New methods for chrome plating by means of physical vapor deposition (PVD) which allow using less toxic products are currently being developed. PVD technology starts directly from the solid material which is to be deposited to then convert it into vapor by means of heating it or bombarding it with energetic ions. The vapor formed condenses on the surface of the substrate, forming a thin layer. The process is performed under vacuum or in a controlled atmosphere to prevent the interaction of the metal vapor with the air. A coating process by means of this method is described in patent application ES 2 239 907 A1.

In order to create a chrome plating, either on plastic or on metal surfaces, copper is first deposited on the surface of the product. This layer is about 20 to 25 microns thick. A deposition of nickel of approximately 15 microns is then carried out and finally the chromium is applied with a typical thickness of about 0.5 microns. In the event that a matte appearance is to be conferred, the last layer of nickel is matted before applying the chromium. However, if the part is to have matte and shiny areas, the area or areas with an appearance different from the majority of the part should be independently inserted, giving rise to an additional complexity. Currently, matte areas can be achieved with the application of organic layers in a partial manner on the chrome-plated shiny surface. This solution has problems of definition in the border of the different finishes and of resistance with respect to the outdoor demands required in automotive applications such as adherence, scratch resistance, etc.

OBJECT OF THE INVENTION

The object of the invention is to solve the technical problems mentioned in the previous section. To that end, it proposes a process for the treatment of parts to give to the surface different glazed and shiny finishes.

The process comprises, on the surface previously coated with a first layer of copper and a second layer of metal, performing a selective etching of the second layer, in which this selective etching is performed according to the area or areas to be matted with respect to the rest of the part.

The selective etching is performed by means of a laser which goes over the surface matting the desired area or areas. The laser is preferably a Yag laser with a wavelength of 1064 nm and a power of 100 W.

The second layer of metal can be of nickel or of nickel and chromium on the latter. In the first case, the layer of nickel is etched whereas in the second case the layer of chromium is etched. After the selective etching, another layer of non-corrodible metal (once again chromium, steel or metals such as Zr, Au, Pt, Rt, In, etc.) is applied. These metals can be applied to the part by PVD or any other suitable technique. The chromium can also be applied by electrolysis, both before being etched and in the final step.

The second layer of metal can be of nickel or of nickel and chromium on the latter. In the first case, the layer of nickel is etched whereas in the second case the layer of chromium is etched. After the selective etching, another layer of non-corrodible metal (once again chromium, steel or metals such as Zr, Au, Pt, Rt, In, etc.) is applied. These metals can be applied to the part by PVD or any other suitable technique. The chromium can also be applied by electrolysis, both before being etched and in the final step.

DETAILED DESCRIPTION OF THE INVENTION

The process of the invention is applied to parts made of plastic material and of metal, for example those treated with a layer of copper and nickel as a preparation for the chrome plating process. In a first embodiment, the partial surface etching is performed on the layer of nickel, which allows obtaining contiguous areas with a different texture/shine. The part is then chrome-plated, with galvanic chromium, for example.

In another embodiment, the part has the layers of copper, nickel and chromium, the layer of chromium being superficially etched.

The selective etching is performed with a laser creating textures or shine (glazing) different from those previously protected.

If the etching is chemical or by scraping, the areas which must not be treated and which will be shiny are protected with protections or masks, the protections being removed afterwards.

Finally, a layer of non-corrodible metal can be applied using PVD technology (sputtering, arc, etc.), the preservation of the different levels of shine or texture obtained being assured as above. The metals used in this last step are chromium, titanium, zirconium, indium, ruthenium or noble metals such as gold or platinum. The different metals give to the part a finish with different colors, the glazed appearance of the areas previously treated by means of the selective etching being respected and the part being protected from external aggressions. The final finish of the non-shiny areas can have different mesh or geometric shapes, the use of laser being preferable for this particular example. For striped finishes, etching by scraping is preferable.

The chromium applied both in the intermediate step and in the last step can be galvanic chromium or chromium applied by PVD.

By means of this process, it is achieved that one and the same part has areas with different finishes without needing to introduce detachable elements in different areas of the main part or use organic layers partially applied on the metal and facilitating that the surface of the part is homogeneous and resistant to outdoor and indoor requirements, for example those of the automotive industry. The finish therefore has areas with a different shine depending on the etching time and the method used (from mirror shine to matte including glazing and all the intermediate tones) the differences in thickness of which cannot be observed by the human eye without optical aids.

By selective etching it is understood that the areas to be treated are previously selected and altered such that the texture and shine of the previously deposited layer of nickel or chromium are partially modified. This gives to the selected surface an appearance different from the base shiny appearance.

The selective etching with laser is performed with a Yag laser with a wavelength of 1064 nm and a power of 100 W, for example.

It would be possible to implement the application with other types of laser with similar features.

Various finishes can be achieved by controlling the power and the action time of the laser, which gives different nuances to the part, from a more mirror-like tone (shiny area) to a more or less matte finish or with a specific texture.

The invention claimed is:

1. A process for the treatment of parts to create a surface with areas with shiny and matte appearances, comprising:
performing selective texturing of a second metallic layer that resides on a first copper layer located on a surface of a part, wherein the selective texturing of the second metallic layer is performed according to the area or areas to be matted with respect to the rest of the surface of the part by a laser which goes over desired area or areas to be matted, wherein the operation time and operation power of the laser are controlled for texturing the second metallic layer,
wherein the laser is a Yag laser with a wavelength of 1064 nm and the operation power is set at 100 W, wherein, after the selective texturing is performed, a layer of non-corrodible metal is applied on the surface of the second metallic layer by physical vapor deposition (PVD), and wherein the non-corrodible metal is a combination of Zr and Cr,
wherein the second metallic layer comprises in turn a lower layer of nickel and another upper layer of chromium, the selective texturing occurring on the layer of chromium.

2. A process according to claim 1, wherein the selective texturing of the layer of chromium is performed until reaching the lower layer of nickel.

3. A process according to claim 1, wherein the chromium is deposited by means of electrolysis.

4. A process according to claim 1, wherein the chromium is deposited by means of PVD.

5. A process according to claim 1, wherein the part is made of plastic material.

6. A process according to claim 1, wherein the part is made of metal.

* * * * *